United States Patent [19]

Dreher et al.

[11] 4,165,329

[45] Aug. 21, 1979

[54] GREASE THICKENING AGENT

[75] Inventors: John L. Dreher, El Cerrito; Garth M. Stanton, San Anselmo, both of Calif.

[73] Assignee: Chevron Research Company, San Francisco, Calif.

[21] Appl. No.: 716,318

[22] Filed: Aug. 20, 1976

Related U.S. Application Data

[63] Continuation of Ser. No. 259,052, Jun. 2, 1972, abandoned, which is a continuation-in-part of Ser. No. 59,780, Jul. 24, 1970, abandoned, Ser. No. 259,053, Jun. 2, 1972, Pat. No. 3,769,212, Continuation-in-part of said Ser. No. 59,780, Jul. 24, 1970, abandoned.

[51] Int. Cl.² .................... C09F 5/00; C11C 3/00; C10M 1/32
[52] U.S. Cl. .................... 260/404.5; 260/553 A; 260/553 R; 260/505 R; 260/112.5 R; 560/34; 560/169; 252/51.5 A
[58] Field of Search .................. 560/34, 169; 260/404.5 T, 404.5 PA, 553 R; 252/51.5 A

[56] References Cited

U.S. PATENT DOCUMENTS

| | | | |
|---|---|---|---|
| 2,849,400 | 8/1958 | Hotten | 260/404.5 PA |
| 3,239,545 | 3/1966 | Rogier | 260/404.5 PA |
| 3,243,372 | 3/1966 | Dreher et al. | 252/51.5 A |
| 3,281,361 | 10/1966 | Koundakjian | 252/51.5 A |
| 3,284,416 | 11/1966 | Kamal | 260/404.5 I |
| 3,346,497 | 10/1967 | Dreher et al. | 252/51.5 A |
| 3,401,027 | 10/1968 | Dreher | 252/51.5 A |
| 3,689,413 | 9/1972 | Loeffler | 252/51.5 A |

*Primary Examiner*—John Niebling
*Attorney, Agent, or Firm*—C. J. Tonkin; S. R. LaPaglia

[57] ABSTRACT

An improved thickening agent is disclosed comprising a polyurea metal salt wherein the polyurea portion of the molecule is prepared by reacting a diisocyanate, a diamine with a monoisocyanate or monoamine. The metal salt is prepared by reacting the polyurea compound with an acid group, such as a carboxylic or a sulfonic acid group, and neutralizing the terminal acid group with a basic metal compound.

13 Claims, No Drawings

GREASE THICKENING AGENT

CROSS-REFERENCE TO RELATED APPLICATIONS

This application is a continuation of U.S. application Ser. No. 259,052, filed June 2, 1972, now abandoned, which in turn is a continuation-in-part of application Ser. No. 59,780, filed July 24, 1970, now abandoned. U.S. application Ser. No. 259,053, filed June 2, 1972, now U.S. Pat. No. 3,769,212, is also a continuation-in-part of said U.S. application Ser. No. 59,780, filed July 24, 1970.

BACKGROUND OF THE INVENTION

This invention relates to a novel grease thickening agent. More particularly, this invention concerns a novel metal-containing polyurea thickening agent.

Modern technology is currently supplying the general public and the process industries with machinery which is designed to operate under a wider range of temperatures and under greater loads than previously available. In addition, most of the newer machines are designed to operate at extremely high speeds. Many of these machines require certain specific lubricating properties which are not available in the conventional lubricants. Thus, modernization of high speed and high temperature equipment has strained the petroleum industry for the development of a second generation of lubricants capable of satisfying the requirements of the new machines. Recently, for example, there has been an increased demand for grease lubricants capable of performing well at temperatures above 300° F. in high speed bearings and gears for periods in excess of 500 hours. In addition, with the further development of the high speed sealed bearings, the grease must be able to endure for the life of the bearing.

There have been numerous grease compositions developed which satisfy most of the new more stringent requirements. Many of these compositions, however, are entirely too expensive for commercialization or only meet some of the lubricating requirements and fail in others. One type of lubricant currently available is the ubiquitous lithium greases. These greases are simply a mixture of a hydrocarbon base oil and a lithium hydroxy stearate thickener with minor amounts of other additives. Although these greases exhibit good lubricating properties and perform well at moderate temperatures, its application in high tempertures and high speed machinery has not been entirely successful. The lithium greases tend to deteriorate in these machines at high temperatures, particularly at temperatures above 300° F. The deterioration leads to a rapid loss of lubrication and ultimately failure of the equipment.

Another type of grease composition which has excellent lubricating properties at the higher temperatures is comprised of a lubricating oil (natural or synthetic) containing a polyurea thickener. This type of lubricant is disclosed in U.S. Pat. Nos. 3,242,210; 3,243,372; 3,281,361; 3,284,357; 3,346,497; and 3,401,027, all assigned to the Chevron Research Company. The polyurea thickener imparts a significant high temperature stability to the grease and, in fact, effects a mild antithixotropic property, i.e., increase in viscosity with increasing shear, to the lubricant. This property of the lubricant is advantageous to prevent the segregation or loss of grease from the moving parts of the machine. While the polyurea grease has solved most of the problems associated with the older lubricants, a need still exists for an improved thickener which, when incorporated into a grease composition, can be used for longer periods at elevated temperatures; and, yet, still be relatively inexpensive to make.

It is, therefore, an object of this invention to provide a new thickening agent.

It is another object of this invention to provide an improved grease thickener capable of imparting good lubricating properties to a grease at high temperatures over prolonged periods.

It is another object of this invention to provide a relatively inexpensive grease thickening agent capable of performing well at high temperatures in high speed application.

It is another object of this invention to provide a method of making an improved grease thickening agent.

SUMMARY OF THE INVENTION

The foregoing objects and their attendant advantages can be realized with a thickening agent comprising a polyurea urea metal salt having a minimum of two ureido groups and having a molecular weight above about 250 AMUs and preferably between about 300 and 2000 AMUs. These polyurea salts can be prepared by two different reaction schemes. In the first, a diisocyanate, a diamine and a monoisocyanate or monoamine are reacted with an amino acid metal salt or an amino carboxyl group source followed by reaction with a basic metal compound capable of hydrolyzing the amino carboxyl group. In the second reaction scheme, a diisocyanate and a diamine are reacted with a monoamine or monoisocyanate to form an intermediate polyurea which is then contacted with water in the presence of a caustic to form the corresponding polyurea amine and by-product carbon dioxide. The amine is then reacted with an anhydride, lactone or sultone and thereafter hydrolyzed with a basic metal compound to form the polyurea metal salt.

We have found that greases containing a polyurea metal salt prepared by the above procedure have increased bearing life, and, in some instances, the bearing life is increased by 50 percent over that of the non-metal containing polyurea lubricants and 800 percent over the commercial lithium greases. The exact mechanism of the polyurea metal salt in effecting the improved lubricating properties to the grease is unknown. However, even though the mechanism is unknown, it is known and it has been demonstrated that by incorporating a polyurea metal salt thickener into a grease composition, the lubricating properties, particularly the bearing life, are substantially improved.

DETAILED DESCRIPTION OF THE INVENTION

In its broadest form, this invention concerns a carboxylate or sulfonate metal salt bonded to an organic polyurea radical having at least two ureido groups and preferably from 2 to 8 ureido groups. A ureido group as referred to herein is defined as follows:

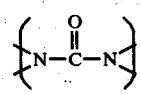

(1)

The preferred polyurea metal salts have structures defined by the following general formulas:

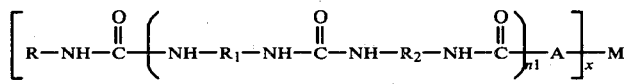

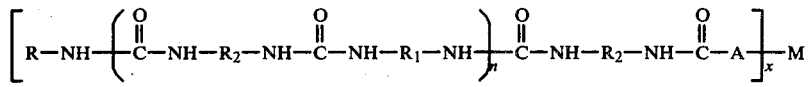

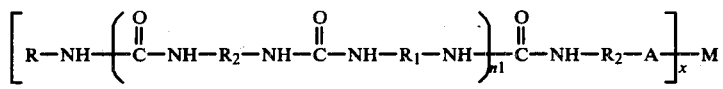

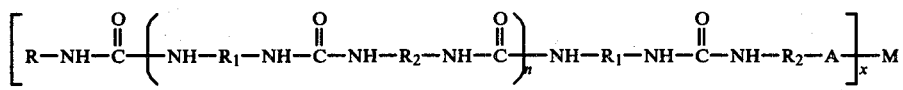

wherein:
n is an integer from 0 to 3;
$n_1$ is an integer from 1 to 3;
x is an integer from 1 to 2 and equal to the primary valence of M divided by the number of carboxyl groups and sulfoxy groups in A;
R is the same or different hydrocarbyl having from 2 to 30 carbon atoms and more preferably from 12 to 24 carbon atoms;
$R_1$ is the same or different hydrocarbylene having from 2 to 30 carbon atoms and more preferably from 2 to 12 carbon atoms;
$R_2$ is the same or different hydrocarbylene having from 2 to 30 carbons and more preferably from 6 to 24 carbons;
M is a metal selected from Groups I, II and III of the Periodic Table; and
A is a divalent or trivalent radical selected from Table I.

TABLE I

| Divalent Radical | Trivalent Radical |
|---|---|
| $-NH-R_1-X-O-$, $\begin{array}{c}-N\diagdown_R^{R_1-C(=O)-O-}\end{array}$, $-NH-C(=O)-R_1-C(=O)-O-$ | $\begin{array}{c}-NH-R_3\diagdown_{R_1-C(=O)-O-}^{O=C-O-}\end{array}$, $-N\diagdown_{R_1-C(=O)-O-}^{R_1-C(=O)-O-}$ |

In the above table, $R_3$ is the same or different trivalent hydrocarbon radical having from 1 to 30 carbons and preferably from 1 to 12 carbon atoms and X is carbon or S=0.

As referred to herein, hydrocarbyl is a monovalent organic radical composed of hydrogen and carbon and may be aliphatic, aromatic or alicyclic or combinations thereof, e.g., aralkyl, alkyl, aryl, cycloalkyl, alkylcycloalkyl, etc., and may be saturated or ethylenically unsaturated (one or more double bonded carbons, conjugated or nonconjugated). The hydrocarbylene, as defined herein, is a divalent hydrocarbon radical which may be aliphatic, alicyclic, aromatic or combinations thereof, e.g., alkyl, aryl, alkylaryl, aralkyl, alkylcycloalkyl, cycloalkylaryl, etc., having its two free valences on different carbon atoms.

The above formulas represent only a general description of the polyurea metal salts of this invention. It should be recognized, for example, that in the preparation of the above polyurea salts some of the molecules may have less than all of the carboxylic groups bonded to a metal atom (M). Some of the metal atoms may be bonded to carboxylate groups in two or more polyurea compounds, such as metals bonded to two molecules of any one structure or molecules of different structures, etc. Moreover, some of the metal atoms may be partially or fully ionized and exist as cations within the product mixture. Thus, it is apparent that while the above formulas generally define the polyurea metal salts, they should not be interpreted as limiting the invention to the exact structures as shown.

Preparation of Polyurea Metal Salts

The polyurea salts having the structure presented in Formula 2 are prepared by reacting (n) moles of a diisocyanate with (n) moles of a diamine, one mole of a monoisocyanate and one mole of an aminocarboxylate salt or an aminocarboxyl group source followed by neutralization of the carboxyl group source with a metal hydroxide. The polyurea salts having the structure set forth in Formula 3 are prepared by the same method as described above with the exception that the monoisocyanate is replaced with one mole of a monoamine. The polyurea salts having the structure set forth in Formula 4 are prepared by reacting (n+1) moles of diisocyanate with (n) moles of a diamine and one mole of a monoamine followed by reaction of the terminal isocyanate group with an aqueous base to form a polyurea amine and by-product carbon dioxide, reaction of the amine group with an anhydride, lactone or sultone having from 2 to 24 carbon atoms and neutralization of the resulting polyurea carboxylic or sulfonic acid with a basic metal compound. Polyurea salts having the structure set forth in Formula 5 are prepared in the same manner as immediately above except that the monoamine is replaced with one mole of a monoisocyanate and (n+1) moles of a diamine are employed.

As can be seen from the above, the polyurea metal salts are prepared by two generally different reaction schemes corresponding to the preparation of polyurea salts having the structures defined by Formulas 2 and 3 and polyurea salts having the structures defined by Formulas 4 and 5.

First Reaction Scheme

In the former preparation, salts defined by Formulas 2 and 3, the desired reactants (diisocyanate, diamine, carboxyl group source and monoisocyanate or monoamine) are admixed within a suitable reaction vessel in the proper proportions and preferably within an inert liquid reaction medium. The reaction may proceed without the presence of a catalyst and is initiated by merely contacting the reactants under conditions conducive for the reaction. Typical reaction temperatures range from 200° to 300° F. and preferably between about 150° and 260° F. Elevated pressures as well as reduced pressures may be employed. In many cases, the reaction will be exothermic and the temperature will rise during the course of the reaction. External heating or cooling, however, may be employed as required. The reaction conditions are maintained for a period sufficient to produce the carboxylated polyurea. The reaction time is dependent upon the process conditions, reactants, presence of a catalyst, etc., but generally varies between about 0.5 and 4 hours.

After formation of the carboxylated polyurea compound, i.e., formation of a polyurea compound having a terminal carboxylic acid, ester or amide thereof, the reaction vessel is charged with a basic metal compound, preferably within an aqueous solution. The metal base reacts to form the terminal carboxyl groups to produce the polyurea metal salt and by product water, alcohol, or ammonia. The reaction may also proceed without the presence of a catalyst and is initiated by merely contacting the carboxylated polyurea with the basic metal compound under conditions conducive for the reaction. Typical reaction temperatures range from 200° to 350° F. and preferably between about 250° and 320° F. The reaction is preferably conducted at atmospheric pressure; however, it may be advantageous to conduct the reaction at subatmospheric pressures so that the by-product water, alcohol or ammonia may be continuously removed from the system as soon as it is formed. If the by-products are not stripped during the reaction, they may be removed from the system on completion of the reaction by heating the products to about 200° F. to 340° F. for approximately 30 to 120 minutes.

The reactions of the material described above are conducted preferably within or inert organic liquid medium, typically a hydrocarbon oil. Where a grease is desired, it is most convenient to perform the reaction in the oil to be thickened. The entire volume of oil to be thickened may be present, or, alternatively, a concentrate of thickened material containing up to 60 weight percent of the polyurea metal salt composition may be formed and this may subsequently be diluted to the desired concentration of the thickener.

The reaction of the basic metal compound and the carboxylated polyurea, may be avoided by replacing the carboxyl group source reactant with an amino carboxylate metal salt in the initial reaction. In this embodiment, the polyurea metal salt is formed directly by reacting the polyurea precursors (diisocyanate, diamine, and monoisocyanate or monoamine) with an amino carboxylate metal salt. The reaction conditions are the same as described above, i.e., temperatures of 150° to 300° F., etc.

The concentration of diisocyanate and diamine present within the reaction medium during the initial reaction will control the size of the polyurea component with a higher concentration producing the larger molecules. The concentration of monoamine, monoisocyanate and carboxylic group source or amine carboxylate salt present, on the other hand, will control the rate at which the polyurea polymer chain is terminated. Thus, an excess of the latter reactants will terminate the polyurea chain early and result in low molecular weight products, whereas, an excess of the former reactants will result in long chain or high molecular weight products. The amounts of the various reactants within the reaction medium are set forth in the following Table II and expressed in terms of mol percent based on the mols of reactants present.

TABLE II

| Ingredient | Concentration of Ingredients | |
|---|---|---|
| | Broad Range (Mol %) | Preferred Range (Mol %) |
| Diisocyanate | 25–40 | 15–20 |
| Diamine | 5–30 | 9–20 |
| Monoisocyanate[1] | 9–20 | 14–20 |
| Monoamine[1] | 10–25 | 15–20 |
| Amino Carboxylate salt[1] | 10–25 | 15–20 |
| Carboxylic Group Source[1] | 10–25 | 15–20 |
| Basic Metal Compound[1] | 10–25 | 15–20 |

[1]When employed.

The monoamine or monoisocyanate used in the formulation of the polyurea salt will form one of the terminal end groups. As already indicated, these terminal end groups will have from 1 to 30 carbon atoms, but are preferably from 5 to 28 carbon, and more desirably from 6 to 25 carbon atoms.

Illustrative of various monoamines are phenylamine, hexylamine, heptylamine, octylamine, decylamine, dodecylamine, tetradecylamine, hexadecylamine, octadecylamine, eicosylamine, dodecenylamine, hexadecenylamine, octadecenylamine, octadecadienylamine, abietylamine, aniline, toluidine, naphthylamine, cumylamine, bornylamine, fenchylamine, tertiary butyl aniline, benzylamine, beta-phenethylamine, etc. Particularly preferred amines are prepared by amidation of natural fats and oils with ammonia followed by oxidation of the amide to the amine. Exemplary amines prepared by the method include stearylamine, laurylamine, palmitylamine, oleylamine, petroselinylamine, linoleylamine, linolenylamine, eleostearylamine, etc. The unsaturated amines are particularly preferred.

Illustrative of monoisocyanates are hexylisocyanate, decylisocyanate, dodecylisocyanate, tetradecylisocyanate, hexadecylisocyanate, phenylisocyanate, cyclohexylisocyanate, xylylisocyanate, cumenylisocyanate, abietylisocyanate, cyclooctylisocyanate, etc.

The diamines and diisocyanates which form the internal hydrocarbon bridges between the ureido groups are, as indicated, of 2 to 30 carbon atoms, preferably from 2 to 26 carbon atoms, and more desirably from 2 to 18 carbon atoms. Exemplary diamines include ethylenediamine, propylenediamine, butylenediamine, hexylenediamine, dedecylenediamine, octylenediamine, hexadecylenediamine, cyclohexylenediamine, cyclooctylenediamine, phenylenediamine, tolylenediamine, xylylenediamine, dianiline methane ditoluidinemethane, bis(aniline), bis(toluidine), etc.

Representative examples of diisocyanates include hexylenediisocyanate, decylenediisocyanate, octadecylenediisocyanate, phenylenediisocyanate, tolylenediisocyanate, bis(diphenylisocyanate), methylene bis(phenylisocyanate), etc. The aromatic diisocyanates, such as tolylenediisocyanate are preferred.

The carboxyl group source as referred to herein must be capable of reacting with an isocyanate to form a ureido group and must have a terminal carboxyl group (acid, ester or amide) capable of being reacted with a basic metal compound to form the corresponding metal salt. Carboxyl group sources which may be employed in the practice of this invention include amino acids, amino esters, amino amides and lactams. The preferred carboxyl group source is selected from an amino acid, an amino ester, a lactam or mixtures thereof. The most preferred carboxyl group source is a lactam.

The amino monocarboxylic acid or amino dicarboxylic acid and the $C_1$-$C_3$ esters thereof will contain a primary (preferred) or secondary amino group. The amino acids or esters, must have at least one active hydrogen atom on the nitrogen, i.e., the tertiary amines cannot be used in the practice of this invention. The amino acids will have from 2 to 31 carbon atoms (including the carboxylated carbon atoms), preferably from 6 to 20 carbon atoms and more preferably from 6 to 12 carbon atoms. The esters of the above will contain from 1 to 3 carbon atoms and preferably 2 carbon atoms in the ester group. The nitrogen atom of the primary amino group must be bonded to a carbon atom in the carboxylic acid or ester other than the carboxylate carbon atom. Similarly, the nitrogen atom in the secondary amino group will be bonded to two carbon atoms, neither of which should be a carboxylate carbon atom.

Typical amino monocarboxylic acids which may be used in this invention include 4-aminobenzoic acid, 4-amino-o-toluic acid, 4-amino-m-toluic acid, 4-amino-p-toluic acid, 4-amino-salicyclic acid, anthranilic acid, 3-aminobenzoic acid, p-amino-α-toluic acid, 1-ethyl-3-aminobenzoic acid, 1-ethyl-4-aminobenzoic acid, glycine, β-alanine, piperidinic acid, 5-aminovaleric acid, 6-aminocaproic acid, 8-aminocaprylic acid, 10-aminocapric acid, 12-aminolauric acid, 14-aminomyristic acid, 16-aminopalmitic acid, 18-aminostearic acid, 18-aminooleic acid, 18-aminolinoleic acid, 18-aminolinolenic acid, 4-aminocyclohexane carboxylic acid, (p-aminophenyl)acetic acid, 6-aminolauric acid, 4-aminocaprylic acid, 12-aminopalmitic acid, 6-(N-methylamine)caprylic acid, 8-(N-ethylamino)caprylic acid, 13-(N-methylamino)myristic acid, etc.

Typical aminodicarboxylic acids which are suitable for use in this invention include aspartic acid, 3-aminoglutaric acid, 3-aminoadipic acid, 4-aminosuberic acid, 5-aminosebacic acid, 2-aminoterephthalic acid, 4-aminophthalic acid, 5-aminoisophthalic acid, etc. Exemplary amino diesters include diethyl 3-aminoglutamate, diethyl 3-aminoadipate, ethylmethyl 5-aminosebacate, etc.

Exemplary aminocarboxylic mono and di esters include methyl p-aminobenzoate, ethyl p-aminobenzoate, propyl p-aminobenzoate, ethyl 4-amino-p-methylbenzoate, propyl-6-aminocaproate, ethyl-18-aminostearate, ethyl piperdinate, dimethyl 5-aminoisophthalate, dipropyl aspartate, dipropylglutamate, etc. Esters of the mono carboxylic acids are preferred.

Amino amides which may be used as reactants will have from 2 to 30 carbon atoms and preferably 3 to 12 carbon atoms. Typical amino amides which may be employed herein are the aminoacyclic amides such as 6-aminocapryl amide, 8-aminocapryl amide, 12-aminolauryl amide, p-aminophenylacetamide, etc. The most preferred carboxyl group source is the cyclic amides and preferably the lactams having from 5 to 8 members in the heterocyclic structure with a nitrogen atom in the bridgehead position. Typical lactams which may be used herein include 2-pyrolidone, 5-methyl-2-pyrolidone, 3,3-dimethyl-2-pyrolidone, 2-piperidone, 3-methyl-2-piperidone, alpha-caprolactam, gamma-caprolactam, beta-methylalphacaprolactam, etc. Caprolactam is the most preferred.

The amino metal carboxylate which may be employed in the practice of this invention typically have the following general formula:

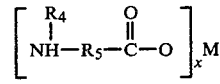

wherein $R_4$ is selected from hydrogen or a hydrocarbyl having from 1 to 20 carbons and preferably from 2 to 12 carbons;

$R_5$ is a hydrocarbylene having from 1 to 20 carbons and preferably from 6 to 15 carbons;

M is a metal atom described supra; and x is an integer defined supra.

Exemplary metal carboxylates include sodium p-aminobenzoate, potassium p-aminobenzoate, lithium p-aminobenzoate, sodium aminoacetate, mono sodium glutamate, mono potassium glutamate, disodium glutamate, sodium 4-amino-p-methylbenzoate, potassium-piperdinate, mono sodium aspartate, mono sodium p-aminoisophthalate, magnesium amino acetate, etc. The preferred amino metal carboxylates are the alkali metal salts of monocarboxylic acids and preferably aromatic monocarboxylic acids.

The amino metal carboxylates are generally highly insoluble within the typical lubricating oil reaction medium. In the event that solubility is problemsome, a mutual solvent having appreciable solubility for the polyurea precursors and for the amino metal carboxylate may be employed. Alternatively, the metal carboxylates may be produced in situ within the reaction medium by charging the metal carboxylate precursors into the reaction mixture along with the polyurea precursors.

The basic metal compounds which may be employed in the practice of this invention to form the polyurea metal salt are hydroxides, oxides and carbonates of the Groups I, II and III metals of the Periodic Table. These include hydroxides, oxides and carbonates of the alkaline (Group I) metals, such as, lithium, potassium, sodium, rubidium, and cesium; the alkaline earth metals (Group II) such as beryllium, magnesium, calcium, strontium and barium; as well as Group III metals such as aluminum. The compound selected must be partially soluble in water and is preferably water-soluble. The preferred compounds are the alkali metal hydroxides, and most preferred are those of the low molecular weight alkali metals, such as, lithium, sodium and potassium, and particularly sodium. Typical compounds which may be employed herein include NaOH, KOH, LiOH, $Ca(OH)_2$, CaO, $CaHCO_3$, $CaCO_3$, $Mg(OH)_2$, $Ba(OH)_2$, $Al(OH)_3$, etc.

Second Reaction Scheme

In the second reaction scheme, i.e., the preparation of the polyurea metal salts having the structure defined in Formulas 4 and 5, a series of separate reaction steps are employed. In the process, an intermediate polyurea compound having a terminal isocyanate group is prepared in substantially the same manner as described supra with the deletion of the carboxyl group source. This intermediate is then subjected to reaction with a dilute aqueous base to form an amine, which is thereafter reacted with an anhydride, lactone or sultone to form a carboxylate polyurea compound. This carboxylated polyurea is then hydrolyzed with a basic metal compound, described supra, to form the polyurea metal salt product. More specifically, in this preparation the desired reactants (diisocyanate, diamine, and monoamine or monoisocyanate) are mixed within a suitable reaction vessel in the proper proportions. Since it is necessary for the urea compound to have a terminal isocyanate group, the diisocyanate is preferably present in a excess. The equivalent ratio of diisocyanate to diamine to monoamine or monoisocyanate generally varies from 2 to 12:1 to 10:1 and preferably from 2 to 8:2 to 8:1. The reaction may proceed without the presence of a catalyst and is initiated by merely contacting the reactants under conditions conducive for the reaction. Typical reaction temperatures range from 100° to 300° F. and preferably from 150° to 260° F. In most cases, the reaction will be exothermic and the temperature will rise during the course of the reaction. Regardless of the exothermicity of the reaction, external heating or cooling may be used as required. The reaction, as before, is preferably carried on within an inert solvent and typically the lubricating oil to be thickened. It is also necessary to agitate the mixture during the reaction to provide intimate contacting of the reactant. The reaction time is not critical but will generally range from 30 to 120 minutes; however, longer times (more than 3 hours) may be employed.

Upon completion of the polyurea reaction, a dilute aqueous solution of an alkali metal hydroxide is charged to the reaction vessel and intimately contacted with the polyurea compound. The temperature of the reaction vessel is preferably maintained from 200° to 360° F. and more preferably to 250° to 320° F. during the reaction. The presence of the dilute caustic effects a decarbonation of the polyurea compound to form a polyurea amine from the terminal isocyanate group and carbon dioxide. The reaction is conducted until the diisocyanate is completely consumed.

At the completion of the reaction and the formation of the polyurea amine, the reaction vessel is charged with an anhydride, lactone or sultone having from 3 to 24 carbons and preferably from 4 to 12 carbons. The anhydride, lactone or sultone reacts with one of the hydrogen atoms on the amine group forming a secondary amine having a free carboxylic or sulfonic acid group. The reaction may proceed without the presence of a catalyst and is initiated by merely contacting the anhydride, lactone or sultone with the polyurea amine under conditions conducive for the reaction. Typical reaction temperatures vary from 100° to 300° F. and more preferably from 150° to 200° F. The reaction is conducted at substantially atmospheric pressure; however, elevated pressures may be employed. At the completion of the reaction, generally between about 30 and 120 minutes, the carboxylated or sulfoxylated polyurea compound is contacted with a basic metal compound and converted to the polyurea metal salt.

The amount of lactone, anhydride or sultone employed in the above reaction should be the stoichiometric amount, i.e. one mol of reactant per mol of polyurea amine present. In the neutralization step, the amount of basic metal compound employed varies depending upon how many carboxyl or sulfoxyl groups are present on the polyurea compound and on the valence of the basic metal compound. Generally, however, the amount of metal base is present in an amount from 1 to 10 percent excess over that stoichiometrally required to produce the polyurea metal salt.

Exemplary anhydrides which may be employed in the practice of this invention include malonic anhydride, succinic anhydride, glutaric anhydride, adipic anhydride, pimelic anhydride, maleic anhydride, phthalic anhydride, chlorendic anhydride, 3,3',4,4'-benzophenanetetracarboxylic anhydride, etc. Exemplary lactones include gamma-butyrolactone, gamma-valerolactone, p-propiolactone, delta-valerolactone, etc. Exemplary sultones which may be employed include propane sultone, butane sultone, napthsultone, etc.

The polyurea metal salt compositions are useful as grease thickeners, to produce greases with good lubricating properties. They are also useful as gellants for a variety of fluids, particularly hydrocarbons, of low viscosity to form fire starter, paints, and the like.

When used as grease thickeners, the compositions described herein are used in oils of lubricating viscosity in amount sufficient to thicken the oil to the consistency of grease, that is, in amounts ranging from 3 to 30 weight percent, preferably from 10 to 15 weight percent based on the weight of the final grease composition.

Preparation of Grease Composition

The greases exhibiting the superior properties of this invention can be prepared by the in situ production of the poly-urea metal salt within a lubricating oil. In this embodiment, the lubricating oil is charged to a grease kettle along with the polyurea precursors, i.e., the reactants which combine to form the polyurea salt. The kettle contents are agitated and the process conditions and steps conducted in a manner discussed supra for the preparation of the polyurea metal salt.

The polyurea metal salts produced within the lubricating oil are generally mixtures of compounds having structures defined in Formulas 2-5 wherein n and $n_1$ varies from 0 to 3 and exist within the grease composition at the same time. For example, the grease composition may concurrently contain metal salts of diurea, triurea, tetraurea, pentaurea, hexaurea, octaurea, etc. In fact, particularly good results have been realized when the polyurea compound is comprised of a combination of diurea salts and tetraurea salts so that the polyurea salts contain a weighted average of 3ureido groups. Moreover, while it is not shown by the formulas, crosslinking between polymer chains through a divalent or trivalent metal atom may also be present in minor amounts within the reaction mixture.

The grease composition can be further processed by subjecting it to shear hardening. Shear hardening is performed by milling the grease in an extrusion or ball type mill under elevated pressures. The milling improves the dispersion of the polyurea and metal carboxylate throughout the base oil resulting in a grease of greatly improved consistency. U.S. application Ser. No. 111,517 discloses a preferred method of shear hardening a grease which can be successfully employed for the composition of this invention.

The lubricating oil which may be employed in the practice of this invention include a wide variety of natural and synthetic oils such as naphthenic-base, paraffin-base, and mixed-base lubricating oils. These oils generally have a viscosity of 35 to 55,000 SUS at 100° F. and preferably from 20 to 500 SUS at a temperature of 210° F. Other hydrocarbon oils include oils derived from coal products and synthetic oils, e.g., alkylene polymers (such as, polymers of propylene, butylene, etc., and mixtures thereof), alkylene oxide-type polymers (e.g., alkylene oxide polymers prepared by polymerizing alkylene oxide, e.g., propylene oxide polymers, etc., in the presence of water or alcohols, e.g., ethyl alcohol), carboxylic acid esters (e.g., those which were prepared by esterifying such carboxylic acids as adipic acid, azelaic acid, seboric acid, sebatic acid, alkenal succinic acid, fumuric acid, maleic acid, etc., with the alcohols such as butyl alcohol, hexyl alcohol, 2-ethylhexyl alcohol, pentaaerythritol, etc.), liquid esters of phosphorus, alkyl benzenes, polyphenols (e.g., biphenols and terphenols), alkyl biphenol ethers, polymers of silicon, e.g., tetraethyl silicate, tetraisopropyl silicate, hexyl(4-methyl-2-pentoxy)disilicane, poly(methyl)siloxane, and poly(methylphenol)siloxane, etc. The base oils may be used individually or in combinations, whenever miscible or whenever made so by use of mutual solvents.

In addition to the polyurea metal salt, other additives may be successfully employed within the grease composition of this invention without affecting its high stability and performance over a wide temperature scale. One type of additive is an antioxidant or oxidation inhibitor. This type of additive is employed to prevent varnish and sludge formation on metal parts and to inhibit corrosion of alloyed bearings. Typical antioxidants are organic compounds containing sulfur, phosphorus or nitrogen, such as organic amines, sulfides, hydroxy sulfides, phenols, etc., alone or in combination with metals like zinc, tin or barium. Particularly useful grease antioxidants include phenyl-alpha-naphthyl amine, bis-(alkylphenyl)amine, n,n-diphenyl-p-phenylenediamine, 2,2,4-trimethyldihydroquinoline oligomer, bis(4-isopropylaminophenyl)ether, n-acyl-p-aminophenol, n-acylphenothiazines, n-hydrocarbylamides or ethylenediamine tetraacetic acid, alkylphenol-formaldehyde-amine poly condensates, etc.

Another additive which may be incorporated into the grease composition of this invention is an anti-corrodant. The anti-corrodant is employed to inhibit oxidation so that the formation of acidic bodies is suppressed and to form films over the metal surfaces which decrease the effect of corrosive materials on exposed metallic parts. Typical anti-corrodants are organic compounds containing active sulfur, phosphorus or nitrogen, such as organic sulfides, phosphides, metal salts of thiophosphoric acid, and sulfurized waxes. Particularly effective corrosion inhibitors are ammonium dinonylnaphthalene sulfonate and sodium nitrite.

Another type of additive which may be employed herein is a metal deactivator. This type of additive is employed to prevent or counteract catalytic effects of metal on oxidation generally by forming catalytically inactive complexes with soluble or insoluble metal ions. Typical metal deactivators include complex organic nitrogen and sulfur-containing compounds such as certain complex amines and sulfides. An exemplary metal deactivator is mercaptobenzothiazole.

In addition to the above, several other grease additives may be employed in the practice of this invention and include stabilizers, tackiness agents, dropping point improvers, lubricating agents, color correctors, odor control agents, etc.

The following examples are presented to illustrate the practice of specific embodiments of this invention and should not be interpreted as limitations upon the scope of the invention.

EXAMPLE 1

In this example, a diureido and a tetraureido sodium salt thickening agent and a grease containing the same are prepared. A 45 liter stainless steel mixer equipped with a stirrer is charged with 10,000 grams of 480 neutral oil, 1780 grams of tall oil fatty amine and 740 grams of caprolactam. The mixture is stirred at 210° F. to disperse the amine and caprolactam within the neutral oil. Thereafter, it is cooled to 150° F. and 188 grams of ethylene diamine are added to the mixture.

The mixture is then charged with a blend of 1712 grams of tolylene diisocyanate in 8000 grams of 480 neutral oil. The diisocyanate-oil blend is added slowly to the previously prepared mixture over a period of 45 minutes. On contacting of the toluene diisocyanate with the fatty amine and caprolactam an exothermic reaction occurs causing a rise in the system temperature. During the course of the reaction, the reaction mixture is diluted with an additional 10,000 grams of neutral oil to reduce the degree of thickening. The mixture is stirred and recycled in the mixer for a period of two hours.

To the mixture is then added 528 grams of a 50 weight percent aqueous sodium hydroxide solution. The mixture is heated to 320° F. for 1 hour with stirring to remove water. The mixture is cooled to 170° F. and milled in a 3 Manton-Gavlin mill. It is diluted with oil to produce a final thickener content of 11 weight percent. The grease is tested under ASTM Test Method D-217 and after 60 strokes has a work penetration ($P_{60}$) of 291.

A sample of the grease is calculated to contain 11 weight percent of thickening agent consisting of 54 weight parts of diureido sodium salt

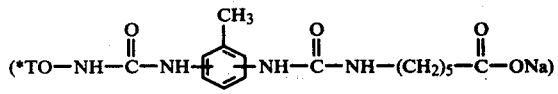

and 46 weight parts of tetraureido sodium salt

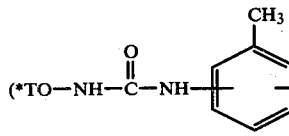 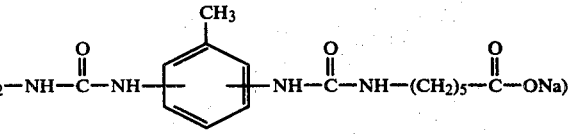

*TO is tall oil fatty amine radical.

EXAMPLE 2

This example is presented to demonstrate the effectiveness of a representative grease of this invention containing the polyurea metal salt in long term performance as compared to a typical lithium stearate grease and a typical polyurea grease. The polyurea metal salt grease to be tested is prepared by the method of Example 1. The lithium grease is a commercially available grease and is composed essentially of the following:

| Lithium Grease Composition | |
|---|---|
| Component | Amount (Wt. %) |
| Lithium hydroxy stearate | 9 |
| Lubricating oil | 83 |
| Commercial E.P. Agent | 7.5 |
| Commercial Rust Inhibitor | 0.4 |

The lithium grease has an ASTM work penetration after 60 strokes ($P_{60}$) of 320.

The second comparison is with a representative polyurea grease composed essentially of the following:

| Polyurea Grease Composition | |
|---|---|
| Component | Amount (Wt. %) |
| Polyurea[1] | 9 |
| Lubricating oil | 89.5 |
| Commercial Antioxidant | 0.5 |
| Commercial Rust Inhibitor | 1.0 |

[1]The polyurea compound is:

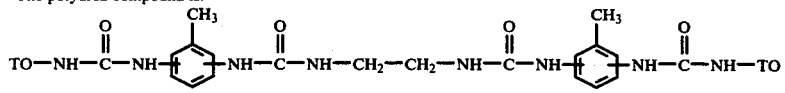

wherein TO is tall oil fatty amine radical.

The polyurea grease has an ASTM work penetration after 60 strokes ($P_{60}$) of 280.

The three greases are subjected to a high-speed bearing life test to determine the maximum bearing life of each of the greases. The test procedure is set forth in Federal Test Method 331.1 (Navy High Speed Bearing Test) and conducted at a temperature of 325° F. and at 10,000 rpm. The results from this test are set forth in the following Table III.

TABLE III

| High Speed Bearing Test @ 325° F. | |
|---|---|
| Test Grease | Bearing Life |
| Polyurea | 1700 Hrs. |
| Lithium | 300 Hrs. |
| Polyurea metal salt | 2600 Hrs. |

The bearing life test revealed the antiwear and lubricating characteristics of the grease and demonstrates the overall performance which can be expected from the particular grease composition. It can be seen from the above table that the polyurea metal salt greases illustrate a 845 percent increase in bearing life over the lithium grease and a 65 percent increase in bearing life over the polyurea grease.

EXAMPLE 3

This example is presented to demonstrate the preparation of polyurea metal salts having structures presented in Formula 3. In the preparation a 22 liter stainless steel mixer is charged with a 600 neutral petroleum oil and varying amounts of tall oil fatty amine and a carboxyl group source. The mixture is stirred at 210° F. to disperse the amine and carboxyl group source within the oil. Following the dispersion of the amine and carboxyl group source, varying amounts of a diamine are added to the mixture.

A mixture of a diisocyanate in a 480 neutral oil is slowly added to the above reaction mixture over a 30-minute period. During the course of the reaction, the reaction mixture is diluted with an additional oil to reduce the degree of thickening. The mixture is stirred and recycled in the reaction vessel for an additional 1-2 hours.

To the mixture is then added an aqueous 50 percent metal hydroxide solution. The mixture is thereafter heated to 320° F. for 1 hour with stirring to remove the water. The mixture is then cooled and milled.

The following table illustrates the preparation of the polyurea metal salts of this invention and of the greases using them as thickeners.

TABLE IV

Polyurea Metal Salt Greases

| | Reactants* | | | | | | | | | | Grease Characteristics | | |
|---|---|---|---|---|---|---|---|---|---|---|---|---|---|
| | Diamine | | Diisocyanate | | Monoamine | | Carboxyl Source | | Metal Hydroxide | | No. of Ureido Groups** | Thickener (wt. %) | ASTM ($P_{60}$) | Bearing Life (Hrs) |
| Grease | Type | Mol % | Type | Mol % | Type | Mol % | Type | Mol % | Type | Mol % | | | | |
| 1 | EDA | 4.7 | TDI | 9.4 | TOFA | 4.7 | BZC | 4.7 | NaOH | 4.1 | 4 | 18.0 | 296 | 681, 534 |
| 2 | EDA | 4 | TDI | 8 | TA | 4 | CPLT | 4 | NaOH | 3.8 | 4 | 16.9 | 313 | — |
| 3 | EDA | 0.05 | TDI | 0.1 | TOFA | 0.05 | CPLT | 0.05 | NaOH | 0.05 | 4 | 20 | — | — |
| 4 | XDA | 2.57 | TDI | 7.75 | TOFA | 5.16 | BZC | 5.16 | NaOH | 5.16 | 3 | 10 | 293 | 213 |
| 5 | EDA | 2.7 | PAPI | 5.4 | TOFA | 2.7 | BZC | 2.7 | NaOH | 2.7 | 4 | 21.5 | 298 | — |
| 6 | EDA | 3.5 | BPM | 7.0 | TOFA | 3.5 | BZC | 3.5 | NaOH | 3.5 | 4 | 24 | 293 | — |
| 7 | PPZ | 0.06 | TDI | 0.12 | TOFA | 0.06 | BZC | 0.06 | NaOH | 0.06 | 4 | 19.6 | 237 | — |
| 8 | PPZ | 4 | TDI | 8 | TOFA | 4 | BZC | 4 | NaOH | 4 | 4 | 21.7 | 344 | — |
| 9 | DTH | 4 | TDI | 8 | TOFA | 4 | BZC | 4 | NaOH | 4 | 4 | 23.4 | 340 | — |
| 10 | DTH | 4 | TDI | 8 | TOFA | 4 | BZC | 4 | NaOH | 4 | 4 | 17.0 | 292 | — |
| 11 | HDA | 4 | TDI | 8 | TOFA | 4 | BZC | 4 | NaOH | 4 | 4 | 20 | 300 | — |
| 12 | HDA | 0.07 | TDI | 0.14 | TOFA | 0.07 | BZC | 0.07 | NaOH | 0.07 | 4 | 16 | 267 | — |
| 14 | EDA | 4 | TDI | 8 | TOFA | 4 | CPLT | 4 | LiOH | 4 | 4 | 18 | 290 | 608, 1161 |
| 16 | EDA | 0.8 | TDI | 2.5 | TA | 1.6 | CPLT | 1.6 | NaOH | 6.55 | 3 | 11 | 291 | 2874, 2436 |
| 18 | EDA | 2.0 | TDI | 6.2 | TA | 4.1 | CPLT | 4.1 | NaOH | 4.1 | | 14 | 307 | — |
| 19 | MPDA | 4.7 | TDI | 9.4 | ODA | 4.7 | BZC | 4.7 | NaOH | 4.7 | 4 | 22 | 284 | — |

TABLE IV-continued

Polyurea Metal Salt Greases

| | Reactants* | | | | | | | | | Grease Characteristics | | | |
|---|---|---|---|---|---|---|---|---|---|---|---|---|---|
| | Diamine | | Diisocyanate | | Monoamine | | Carboxyl Source | | Metal Hydroxide | | No. of Ureido | Thick- ener (wt. | ASTM | Bearing Life |
| Grease | Type | Mol % | Type | Mol % | Type | Mol % | Type | Mol % | Type | Mol % | Groups** | %) | ($P_{60}$) | (Hrs) |
| 21 | NONE | — | BPM | 4.8 | ODA | 4.8 | BZC | 4.8 | NaOH | 4.8 | 2 | 16 | 306 | 278, 369 |
| 22 | EDA | 0.92 | BPM | 2.85 | TOFA | 1.9 | CPLT | 1.9 | NaOH | 1.9 | 3 | 13 | 326 | — |
| 23 | MPDA | 1.4 | TDI | 4.34 | TOFA | 2.9 | CPLT | 2.9 | NaOH | 2.9 | 3 | 15 | 302 | — |
| 24 | EDA | 0.62 | TDI | 1.87 | TOFA | 1.25 | DAIP | 1.25 | NaOH | 2.5 | 3 | 10.4 | 300 | — |
| 25 | EDA | 0.025 | TDI | 0.776 | TOFA | 0.05 | DPA | 0.05 | NaOH | 0.1 | 3 | 12 | 300 | — |
| 26 | EDA | 0.025 | TDI | 0.075 | TOFA | 0.05 | AAA | 0.05 | NaOH | 0.05 | 3 | 11.1 | 330 | — |
| 27 | EDA | 1.0 | TDI | 3.1 | TOFA | 2.06 | PYD | 2.06 | NaOH | 2.06 | 3 | 10 | 296 | — |

NOTES FOR TABLE
*The reactants of Table IV are abbreviated as follows:
AAA = p-amino-acetanilide
BPM = bis(p-phenylisocyanate)methane
BZC = benzocaine (ethyl ester of p-aminobenzoic acid)
CPLT = ε-caprolactam
DPA = dipropyl aspartate
DTH = 1,6-diamino-2,2,4-trimethylhexane
DAIP = Dimethyl 5-aminoisophthalate
EDA = ethylene diamine
HDA = 1,6-hexanediamine
MPDA = Metaphenylene diamine
NaOH = Sodium hydroxide
ODA = Octadecylamine
PAPI = polymethylene polyphenyl diisocyanate (MW = 381–400)
PPZ = piperazine
PYD = 2-pyrrolidinon
TA = tallow amine
TDI = Toluene diisocyanate
TOFA = Tall oil fatty amine
XDA = Xylene diamine
** = The average number of polyurea groups in entire composition.

The above table demonstrates the practice of the instant invention in the preparation of numerous representative polyurea metal salts and corresponding greases containing the salts. The 27 compositions amply illustrate the broad range of diamines, diisocyanates, monoamines and carboxyl group sources which can be successfully employed to prepare the polyurea salts. Also illustrated is the wide range of concentrations for the various reactants as well as for the total thickener content which may be employed.

EXAMPLE 4

This example is presented to demonstrate the practice of this invention wherein a variety of metal moieties can be used in the preparation of the polyurea salt. In the preparation, a process identical to that described in Example 1 is used with the exception that LiOH, Ba(OH)$_2$ or Ca(OH)$_2$ is substituted for NaOH in the neutralization of the polyurea caprolactam adduct. The properties of the various greases are given in the following Table V. A sample of the lithium and sodium greases are tested under Federal Test Methods Standards 791a, Method 331, and the bearing life determined. The following Table V also presents the results from this test.

TABLE V

| | Grease Characteristics | | | | |
|---|---|---|---|---|---|
| Type | Thick- ener (%) | Ureido Groups (No.) | $P_{60}$ | Bearing Life (Hrs)[1] | Dropping Point ASTM D-2265 |
| Calcium salt | 18 | 4 | very soft | — | — |
| Barium salt | 18 | 4 | 301 | — | 499; 492 |
| Lithium salt | 18 | 4 | 290 | 1,161; 608 | 484 |
| Sodium salt[2] | 11 | 3 | 291 | 2436; 2874 | 469; 483 |

[1]Test conducted at 350° F. at 10,000 rpm.
[2]Bearing Life test conducted at 325° F. at 10,000 rpm.

The above table illustrates the preparation of various metal salts and the effectiveness of greases containing these metal salts in lubricating bearings at elevated temperatures. Also illustrated is the improvement resulting from the employment of the alkali metal salts.

EXAMPLE 5

This example is presented to illustrate the preparation of polyurea metal salts having the structure presented in Formula 4 of the specification and the effectiveness of these compositions as thickening agents for grease compositions. In the preparation, a 22 liter stainless steel mixer is charged with 7212 grams of a 600 neutral oil, 1088 grams (4 mols) of a tall oil fatty amine and 120 grams (2 mols) of a diamine. The contents of the mixer are stirred and heated to a temperature of 150° F. to uniformly disperse the reactants within the oil reaction medium. Thereafter, the solution of 3376 grams of the above neutral oil containing 1044 grams (6 mols) of toluene diisocyanate are charged to the mixer over a period of 45 minutes. Contents of the mixer are vigorously agitated at a temperature of 165°–170° F. for a period of 1 hour to produce the polyurea compound within the lubricating oil. At the end of the reaction the mixture is heated to a temperature of 190° F. and 216 grams of 10 percent sodium hydroxide solution are charged to the mixer and intimately contacted with the polyurea compound. The contents of the mixer are maintained at these conditions for 45 minutes. Thereafter, the mixture is dehydrated at a temperature of 310° F.

After the contents of the mixer have been dehydrated, 4 mols of a lactone or anhydride and 1650 grams of 600 neutral oil are charged to the mixer and intimately contacted with its contents. The contents of the mixer are maintained at a temperature of 190° F. for a period of 1 hour to effect the carboxylation of the polyurea amine compound. After approximately 1.5 hours, a 50 percent aqueous solution of sodium hydroxide is charged to the mixer and intimately contacted with the carboxylated polyurea. The temperature of the system is maintained at 190° F. during this period and the contents vigorously agitated. After approximately 0.5 hour, the temperature of the system is increased to 310° F. to strip the grease composition of water.

An additional 1889 grams of 600 neutral oil is charged to the mixer and the contents milled at 4500 psi. Grease characteristics are then measured and reported in the following table. The bearing life on the greases tested is conducted in accordance with Federal Test Methods Standard 791a, Method 331 at a temperature of 350° F. and at 10,000 rpm.

TABLE VI

| | Polyurea Metal Salt Greases | | | | | | | | |
|---|---|---|---|---|---|---|---|---|---|
| | Reactants | | | | | | Grease Characteristics | | |
| Grease | EDA (Mol %) | TDI (Mol %) | Lactone or Anhydride Type[1] | (Mol %) | TOFA (Mol %) | NaOH (Mol %) | No. of Ureido Group | Thickener (Wt. %) | ASTM ($P_{60}$) | Bearing Life (Hrs.) |
| 1 | 1.5 | 4.5 | SA | 3.0 | 3.0 | 3.0 | 3 | 13 | 294 | — |
| 2 | 2.0 | 6.0 | BL | 4.0 | 4.0 | 4.0 | 3 | 11.5 | 300 | 700 |
| 3 | 1.75 | 5.25 | PL | 3.5 | 3.5 | 3.5 | 3 | 10 | 290 | — |
| 4 | 0.025 | 0.075 | PA | 0.05 | 0.05 | 0.05 | 3 | 14 | 296 | — |
| 5 | 0.025 | 0.075 | MA | 0.05 | 0.05 | 0.05 | 3 | 13 | 296 | — |
| 6 | 0.025 | 0.075 | BTCA | 0.05 | 0.05 | 0.05 | 6 | 15 | 294 | — |

[1]SA = Succinic anhydride
BL = gamma-butyrolactone
PL = beta-propiolactone
PA = Phthalic anhydride
MA = Maleic anhydride
BTCA = 3,3,4,4-Benzophenene tetra carboxylic anhydride.

The compositions illustrated in the above Table VI are calculated to have the following structures:

| Grease | Polyurea Metal Salt Structure |
|---|---|
| 1 | 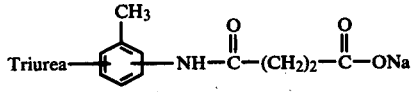 |
| 2 | 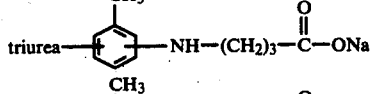 |
| 3 | 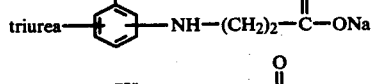 |
| 4 | 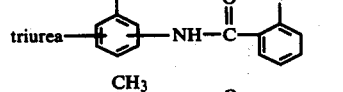 |
| 5 | 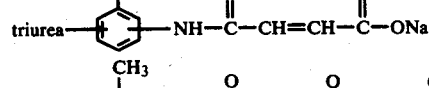 |
| 6 | 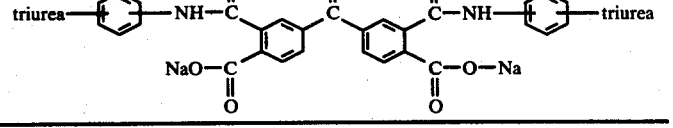 | wherein triurea has the structure

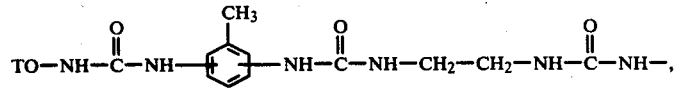

and TO represents a tall oil fatty amine radical.

This example thus illustrates the preparation of various representative polyurea metal salts having the structure set forth in Formula 4 and the effectiveness of these compositions in thickening a lubricating oil to the consistency of grease. Also illustrated is the excellent bearing life of one of the representative greases.

amount of 11 weight percent based on the weight of total grease composition.

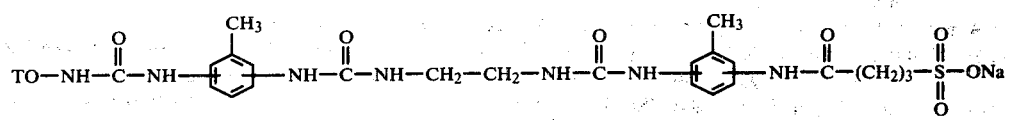

wherein TO is a tall oil radical.

EXAMPLE 6

This example is presented to demonstrate the preparation of a polyurea metal salt having the structure presented in Formula 4 and prepared from neutralizing a polyureasulfoxylate with sodium hydroxide.

In the preparation, a 600 ml. glass beaker is charged with approximately 100 grams of a 600 neutral oil, 0.05 mol of tall oil fatty amine and 0.025 mol of ethylene diamine. The contents of the beaker are stirred and heated to a temperature of about 150° F. to uniformly disperse the reactants within the oil reaction medium. Thereafter, approximately 65 grams of 600 neutral oil and 0.075 mol of toluene diisocyanate are charged to the glass beaker and the contents vigorously agitated at a temperature of 165°-170° F. for a period of 1 hour. At the end of the reaction, the beaker is heated to 190° F. and 25 grams of 10 percent sodium hydroxide solutions are admixed with the beaker contents. The admixture is agitated at the above temperature for a period of 45 minutes and thereafter dehydrated at a final temperature of 310° F.

After the contents of the beaker have been dehydrated, 0.05 mol of propane sultone

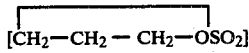

are charged to the beaker. The contents are mixed for a period of 1 hour at 190° F. to effect a sulfoxylation of the polyurea amine compound.

After approximately 1.5 hours, a 50 percent aqueous solution of sodium hydroxide (0.05 mol) is charged to the beaker and intimately contacted with the sulfoxylated polyurea. The temperature is maintained at 190° F. for a period of approximately 30 minutes. At the end of the reaction, the water is stripped from the system by heating to a temperature of about 310° F.

An additional 128 grams of 600 neutral oil is charged to the beaker and the contents milled at 4500 psi. The ASTM work penetration after 60 strokes is 294.

The polyurea metal salt is calculated to have the following structure and is present within the oil in an

EXAMPLE 7

This example is presented to demonstrate the preparation of a representative polyurea metal salt having the structure presented in Formula 2.

A 600 ml. flask is charged with 100 grams of 600 neutral oil and 5.65 grams of caprolactam. The contents are heated to 150° F. and 3 grams of ethylene diamine with 5 grams of oil are charged to the flask. Thereafter, 23 grams of 600 neutral oil and 8.7 grams of tolylene diisocyanate and 14.75 g. of octadecylisocyanate are admixed with the flask contents. During the reaction, the temperature of the flask rises to 180° F. and is stirred for 90 minutes. An additional 0.9 grams of EDA are added to insure that all of the diisocyanate has reacted.

The contents of the flask are transferred to a 600 ml. glass beaker and 4 grams of sodium hydroxide in 4 grams of water are charged to the beaker. The oil in the beaker is calculated to contain 21 weight percent of polyurea sodium salt. The ASTM work penetration ($P_{60}$) is measured to be 294. The structure of the polyurea compound is calculated to be as follows:

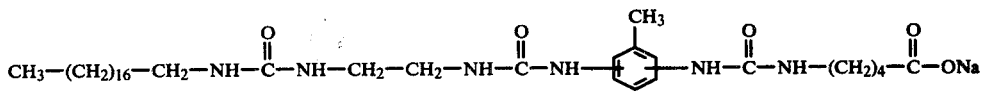

EXAMPLE 8

This example is presented to demonstrate the preparation of a representative polyurea metal salt having the structure presented in Formula 5.

The processing steps are the same as shown in Example 6 except that the following reactants and amounts are employed.

| Components | Amounts | |
| --- | --- | --- |
| | Mols | Grams |
| 1. Octadecyl isocyanate | 0.05 | 14.75 |
| 2. Ethylene diamine | 0.05 | 3.0 |
| 3. Tolylene Diisocyanate | 0.05 | 8.7 |
| 4. Succinic Anhydride | 0.05 | 5.0 |
| 5. 600 Neutral Oil | | 128 |
| 6. NaOH (10%) | | 5 |
| 7. NaOH (50%) | 0.05 | 4.0 |

The grease exhibits an ASTM worked penetration after 60 strokes of 261. The polyurea metal salt is calculated to have the following structure:

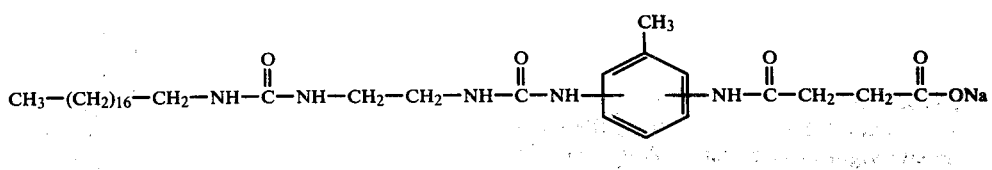

It is apparent that many widely different embodiments of this invention may be made without departing from the scope and spirit thereof; and, therefore, it is not intended to be limited except as indicated by the following appended claims.

We claim:

1. A mixture of polyurea metal salts having predominant structures presented in one of the following formulas:

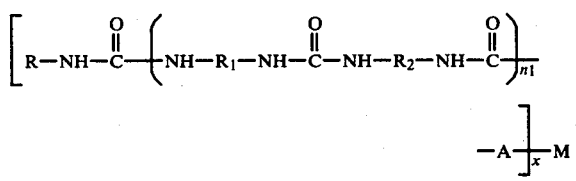

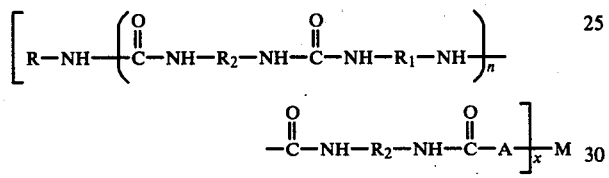

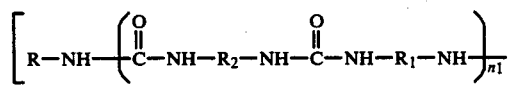

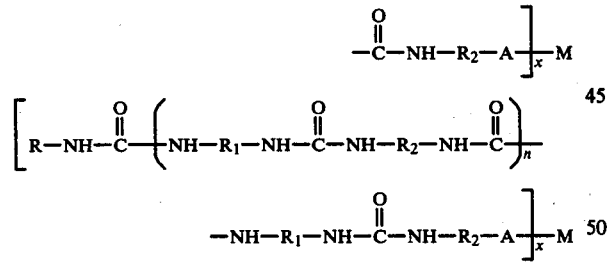

wherein:
n is an integer from 0 to 3;
$n_1$ is an integer from 1 to 3;
x is an integer from 1 to 2 and equal to the primary valence of M divided by the number of carboxyl groups in A;
R is the same or different hydrocarbyl having from 2 to 30 carbon atoms;
$R_1$ is the same or different hydrocarbylene having from 2 to 30 carbon atoms;
$R_2$ is the same or different hydrocarbylene having from 2 to 30 carbon atoms;
M is a metal selected from Groups IA and IIA and aluminum; and
A is a divalent radical selected from the group consisting of:

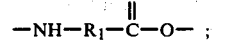

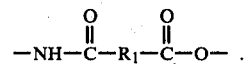

2. The mixtures defined in claim 1 wherein said metal is selected from Group IA of the periodic table.

3. The mixtures defined in claim 1 wherein n is 1, $n_1$ is 2, R is an aliphatic hydrocarbyl, $R_1$ is an alkylene having from 2 to 8 carbons; $R_2$ is an aromatic hydrocarbylene and A is a divalent radical.

4. The mixtures defined in claim 3 wherein said metal is sodium.

5. A mixture of polyurea compounds having the predominant structure:

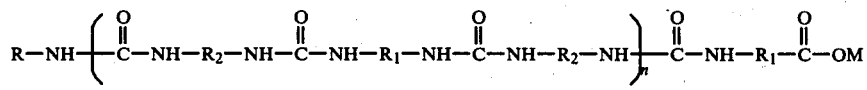

wherein:
n is an integer from 0 to 3;
R is the same or different hydrocarbyl having from 2 to 30 carbons;
$R_1$ is the same or different hydrocarbylene having from 2 to 30 carbons; and
M is an alkali metal.

6. The mixture defined in claim 5 wherein said alkali metal is sodium.

7. A mixture of polyurea compound having the predominant structure:

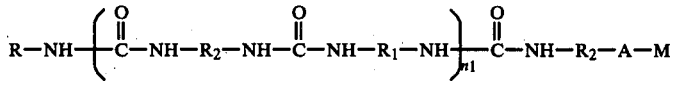

wherein:
$n_1$ is an integer from 1 to 3;
R is the same or different hydrocarbyl having from 2 to 30 carbons;
$R_1$ is the same or different hydrocarbylene having from 2 to 30 carbons;
$R_2$ is the same or different hydrocarbylene having from 2 to 30 carbons; and
M is an alkali metal; and
A is a divalent radical selected from

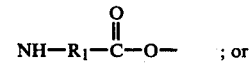

8. The mixture defined in claim 7 wherein said alkali metal is sodium.

9. A composition of matter produced by reacting at a temperature between 150° and 300° F. for a period of from about 0.5 to 4 hours a $C_2$-$C_{30}$ diamine, a $C_2$-$C_{30}$ diisocyanate and a $C_1$-$C_{20}$ mono amine or $C_1$-$C_{10}$ mono-isocyanate with a carboxyl group source selected from the group consisting of amino acids having from 2 to 30 carbons to form a carboxylated polyurea, followed by hydrolysis of the carboxylated polyurea at a temperature between 200° and 350° F. with a basic metal compound selected from hydroxides, oxides and carbonates of Group IA or IIA metals or aluminum.

10. The composition defined in claim 9 wherein said carboxyl group source is an amino monocarboxylic acid.

11. The composition defined in claim 9 wherein said diamine is ethylene diamine, said diisocyanate is tolylene diisocyanate, and basic said metal compound is sodium, potassium or lithium hydroxide.

12. A composition of matter produced by:
reacting at a temperature in the range of 100° to 300° F. for a period of from about 0.5 to 4 hours a $C_2$–$C_{30}$ diamine, a $C_2$–$C_{30}$ diisocyanate and a $C_1$–$C_{30}$ monoisocyanate in proportions sufficient to produce a polyurea compound having at least two ureido groups and having at least one terminal isocyanate group;

contacting said polyurea compound with water in the presence of sodium hydroxide at a temperature in the range of 200° to 360° F. to form a polyurea amine;

contacting said polyurea amine with a lactone having from 3 to 24 carbons at a temperature of from about 100° to 300° F. to form a carboxylated polyurea; and contacting at a temperature between 200° and 350° F. said carboxylated polyurea with a basic metal compound selected from hydroxides, oxides and carbonates of Groups I, II or III metals to form a polyurea metal salt.

13. The composition defined in claim 12 wherein said diamine is ethylene diamine; said diisocyanate is tolyene diisocyanate; and said metal hydroxide is sodium, potassium or lithium hydroxide.

* * * * *